(No Model.)

S. H. JONES.
FAUCET FILTER.

No. 585,674. Patented July 6, 1897.

WITNESSES
C. E. Hunt
L. W. Stockbridge

INVENTOR,
Samuel H. Jones,
by John Wedderburn
Attorney

UNITED STATES PATENT OFFICE.

SAMUEL H. JONES, OF SCRANTON, PENNSYLVANIA.

FAUCET-FILTER.

SPECIFICATION forming part of Letters Patent No. 585,674, dated July 6, 1897.

Application filed November 4, 1896. Serial No. 611,009. (No model.)

*To all whom it may concern:*

Be it known that I, SAMUEL H. JONES, a citizen of the United States, residing at Scranton, in the county of Lackawanna and State of Pennsylvania, have invented certain new and useful Improvements in Faucet-Filterers; and I do hereby declare the following to be a full, clear, and exact description of the invention, such as will enable others skilled in the art to which it appertains to make and use the same.

My invention relates to certain new and useful improvements in filters, the object of the same being to provide a simple and cheaply-constructed device of this character which can be readily attached to and disconnected from an ordinary faucet, which is effective in filtering, and which is self-cleaning.

My improved filter is made up of a casing having a cylindrical opening at its upper end provided with internal screw-threads, by means of which it may be connected to the faucet, a spout leading outwardly from said casing at a point near its upper end, a filtering-screen at the point of connection of said spout with said casing, a removable cap upon the lower end of said casing, a coil-spring on the inner side thereof, and a ball fitting upon the upper end of said spring for breaking the force of the water and preventing the direct impact thereof upon the bottom of said casing.

The invention also consists in other details of construction and combinations of parts, which will be hereinafter more fully described and claimed.

Figure 1:
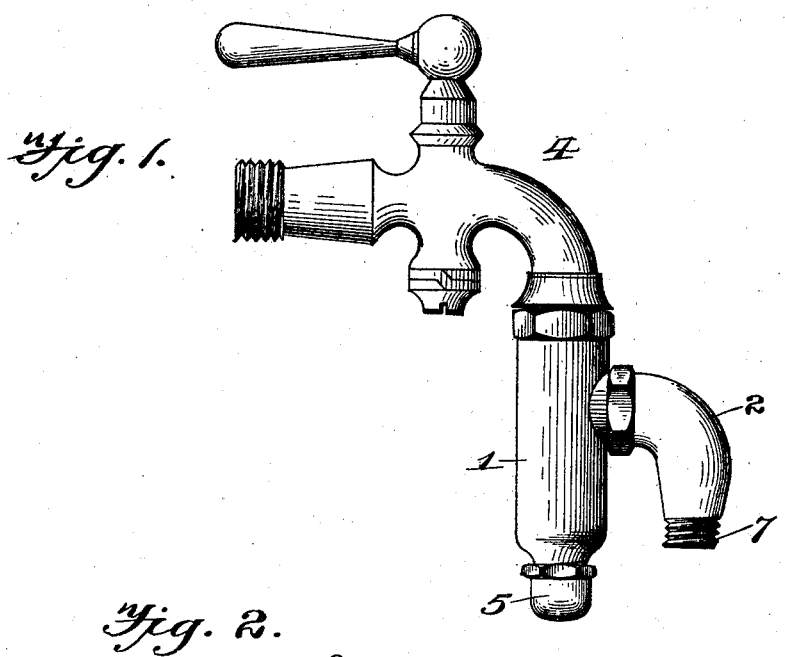
Figure 2:
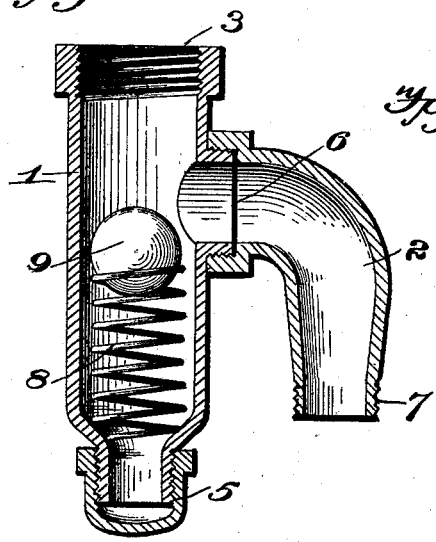
Figure 3:
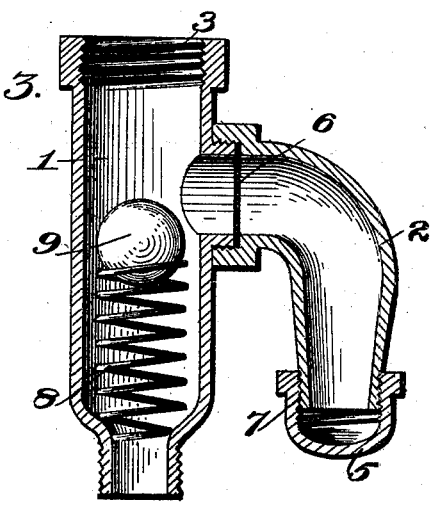

In the drawings forming a part of this specification, Figure 1 represents a side elevation of my improved filter shown applied to an ordinary faucet. Fig. 2 is a longitudinal section through the same. Fig. 3 is a similar view showing the cap which normally fits upon the lower end of the casing removed and placed upon the lower end of the spout.

Like reference-numerals indicate like parts in the different views.

My improved filter is made up of a casing 1, having a spout 2 screwed thereto and leading outwardly and downwardly therefrom. The said spout 2 is connected to the casing 1 at a point near the upper end of the latter, forming a sump or pit for receiving the filterings at the lower end thereof. The upper end of the casing 1 is formed with a cylindrical opening which has internal screw-threads 3 thereon, by means of which it may be connected to the faucet 4. The lower end of said casing is slightly contracted and has fitting upon it a screw-cap 5, which may be removed when desired. At the point of connection between the spout 2 and the casing 1 a filtering-screen 6 is located, and the lower end of the said spout is formed with external screw-threads 7, upon which the cap 5 may be screwed. In the lower end of the casing 1 is mounted a coil-spring 8, upon the top of which rests a ball 9, provided for the purpose of breaking the force of the water projecting thereupon and preventing the direct impact thereof with the bottom of the sump.

In using my device the same is screwed upon the faucet 4, as shown in Fig. 1 of the drawings, with the cap 5 in place upon the lower end of the casing 1. The water from the faucet then passes into said casing, the force thereof being directed downwardly. It is broken up by means of the ball 9 upon the upper end of the casing, and thence passes through the filtering-screen 6 and out through the spout 2. In this passage the solid particles of matter contained in the water are completely removed and settle down upon the bottom of the sump. When it is desired to clean the filter, the cap 5 is removed from the lower end of the casing 1 and screwed upon the lower end of the spout 2. The water from the faucet 4 then passes into the casing and out through the opening at the bottom thereof, completely flushing the same and removing the filth and dirt contained in the sump. The inner side of the filtering-screen 6 is also cleansed. The spring 8 and the ball 9 are so shaped and located that a free passage of water is permitted on each side thereof, but the direct force of the same is broken up thereby.

When it is desired to remove the filtering-screen 6, it may be readily done by unscrewing the spout 2 from the casing 1, which will permit ready access to said screen.

The device is extremely simple in construction, can be cheaply made, and is effective for the purpose for which it was designed.

Having now described my invention, what I claim as new, and desire to secure by Letters Patent, is—

1. A filter, made up of a casing adapted to be screwed upon an ordinary faucet having an opening in its lower end, a spout extending outwardly from the upper end of said casing, a filtering-screen therein, and a cap normally fitting upon the lower end of said casing and adapted to be screwed upon the lower end of said spout, substantially as and for the purpose described.

2. A filter, made up of a casing adapted to be screwed upon an ordinary faucet having an opening at its lower end, a spout extending outwardly from the upper end of said casing, a filtering-screen therein, a cap normally fitting upon the lower end of said casing and adapted to be screwed upon the lower end of said spout, and means located in said casing for preventing the direct impact of the water from the faucet with the bottom thereof, but permitting the free passage of said water therethrough.

3. A filter, made up of a casing adapted to be screwed upon an ordinary faucet having an opening at its lower end, a spout extending outwardly from the upper end of said casing, a filtering-screen therein, a cap normally fitting upon the lower end of said casing and adapted to be screwed upon the lower end of said spout, a coil-spring fitting within the lower end of said casing, and a ball loosely mounted upon the upper end of said spring whereby the direct impact of the water against the bottom of said casing is prevented, but free passage of the same therethrough is permitted.

In testimony whereof I have signed this specification in the presence of two subscribing witnesses.

SAMUEL H. JONES.

Witnesses:
 GEO. B. BEACH,
 T. H. HARRIS.